United States Patent
Chu et al.

(10) Patent No.: US 9,693,261 B1
(45) Date of Patent: Jun. 27, 2017

(54) METHOD AND APPARATUS FOR TRANSMITTING AND RECEIVING A PACKET WITH A TRAVELING PILOT IN SUB-1 GHZ BAND VIA ONE OR MORE SPACE TIME STREAMS BASED ON CAPABILITIES INFORMATION

(71) Applicant: Marvell International LTD., Hamilton (BM)

(72) Inventors: Liwen Chu, San Ramon, CA (US); Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 114 days.

(21) Appl. No.: 14/563,176

(22) Filed: Dec. 8, 2014

Related U.S. Application Data

(60) Provisional application No. 61/920,975, filed on Dec. 26, 2013.

(51) Int. Cl.
| | |
|---|---|
| *H04L 27/26* | (2006.01) |
| *H04J 11/00* | (2006.01) |
| *H04L 5/00* | (2006.01) |
| *H04W 40/00* | (2009.01) |
| *H04W 28/06* | (2009.01) |
| *H04W 84/12* | (2009.01) |

(52) U.S. Cl.
CPC .......... *H04W 28/065* (2013.01); *H04W 84/12* (2013.01)

(58) Field of Classification Search
CPC .. H04L 27/2675; H04L 5/0048; H04L 5/0051
USPC ........................................................ 370/208
See application file for complete search history.

(56) References Cited

U.S. PATENT DOCUMENTS

| | | | | |
|---|---|---|---|---|
| 2013/0109382 | A1* | 5/2013 | Patwardhan | .......... H04W 60/02 455/435.1 |
| 2013/0315323 | A1* | 11/2013 | Porat | ..................... H04L 5/0048 375/260 |

(Continued)

OTHER PUBLICATIONS

IEEE Std.802.11a-1999; Part 11: Wireless LAN Medium Access Control (MAC) and Physical Layer (PHY) Specifications: High Speed Physical Layer in the 5 GHZ Band.

(Continued)

*Primary Examiner* — Parth Patel
*Assistant Examiner* — Jason Harley

(57) ABSTRACT

A first network device including a physical layer (PHY) module and a medium access control (MAC) module. The MAC module, in a sub-1 GHz band, transmits the capabilities element to a second network device. The capabilities element includes: a multi-bit field indicating whether transmission of a packet with a traveling pilot is supported by the first network device; or a field indicating whether transmission of a spatial stream over a 1 MHz channel to the second network device is supported by the first network device. The MAC module, subsequent transmitting the capabilities element, forwards data to the PHY module. The PHY module: generates the packet to include the data, where the packet includes the traveling pilot if the capabilities element indicates transmission of the packet with the traveling pilot is supported; and according to the capabilities element, transmits the packet to the second network device via the spatial stream.

21 Claims, 5 Drawing Sheets

(56) References Cited

U.S. PATENT DOCUMENTS

| | | | | |
|---|---|---|---|---|
| 2014/0185662 A1* | 7/2014 | Azizi | .................. | H04L 27/2647 375/232 |
| 2015/0139089 A1* | 5/2015 | Azizi | .................... | H04W 4/008 370/329 |

OTHER PUBLICATIONS

IEEE P802.11g/D8.2, Apr. 2003;Part 11: Wireless LAN Medium Access Control (MAC) and Physical Layer (PHY) Specifications: Further Higher Data Rate Extension in the 2.4 GHz Band.

IEEE Std. 802.11b-1999/Corr 1-2001;Part 11: Wireless LAN Medium Access Control (MAC) and Physical Layer (PHY) Specifications: Amendment 2: Higher-Speed Physical Layer (PHY) extension in the 2.4 GHz band—Corrigendum 1.

IEEE 802.11n: Multi-Rate Layered Decoder Architecture for Block LDPC Codes of the IEEE 802.11n Wireless Standard.

IEEE 802.11af/D1.05: Part 11: Wireless LAN Medium Access Control (MAC) and Physical Layer (PHY) Specifications: Amendment 4: White Spaces Operation.

IEEE P802.11ac/D2.0; Part 11: Wireless LAN Medium Access Control (MAC) and Physical Layer (PHY) Specifications: Amendment 4: Enhancements for Very High Throughput for Operation in bands below 6 GHz.

IEEE 802.11ad/D5.0; Part 11: Wireless LAN Medium Access Control (MAC) and Physical Layer (PHY) Specifications: Amendment 3: Enhancements for Very High Throughput in the 60GHz Band.

Part 11: Wireless LAN Medium Access Control (MAC) and Physical Layer (PHY) Specifications.

IEEE Std 802.11d-2001 (Amendment to IEEE Std. 802.11, 1999 Edition, IEEE Std 802.11a-1999, and IEEE Std 802.11b-1999); IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 3: Specification for operation in additional regulatory domains; Sponsor: LAN/MAN Standards Committee of the IEEE Computer Society; Jun. 14, 2001; 34 pages.

IEEE Std 802.15.4-2011 (Revision of IEEE Std. 802.15.4-2006); IEEE Standard for Local and metropolitan area networks—Part 15.4: Low-Rate Wireless Personal Area Networks (LR-WPANs); IEEE Computer Society; Sponsored by the LAN/MAN Standards Committee; Sep. 5, 2011; 314 pages.

IEEE P802.11ah/D3.0, Oct. 2014 (Amendment to IEEE Std 802.11REVmc / D3.0) IEEE P802.11ah™/D3.0 Draft Standard for Information technology—Tele-communications and information exchange between systems Local and metropolitan area networks— Specific requirements; Part 11: Wireless LAN Medium Access Control (MAC) and Physical Layer (PHY) Specifications; Amendment 6: Sub 1 GHz License Exempt Operation; Prepared by the 802.11 Working Group of the LAN/MAN Standards Committee of the IEEE Computer Society; 611 pages.

* cited by examiner

METHOD AND APPARATUS FOR TRANSMITTING AND RECEIVING A PACKET WITH A TRAVELING PILOT IN SUB-1 GHZ BAND VIA ONE OR MORE SPACE TIME STREAMS BASED ON CAPABILITIES INFORMATION

CROSS-REFERENCE TO RELATED APPLICATIONS

This application claims the benefit of U.S. Provisional Application No. 61/920,975, filed on Dec. 26, 2013. The entire disclosure of the application referenced above is incorporated herein by reference.

FIELD

The present disclosure relates to wireless local area networks, and more particularly to wireless transmission and reception according to the IEEE 802.11ah standard.

BACKGROUND

Wireless local area networks (WLANs) have evolved with the introduction of various Institute of Electrical and Electronics Engineers (IEEE) 802.11 standards such as IEEE 802.11a, IEEE 802.11b, IEEE 802.11g, IEEE 802.11n, and IEEE 802.11ac. In general, the later in time the IEEE 802.11 standard was introduced, the more data throughput provided by network devices operating according to the IEEE 802.11 standard. For example, single user (SU) data throughput of network devices operating according to IEEE 802.11b is 11 mega-bits-per-second (Mbps), whereas SU data throughput of network devices operating according to IEEE 802.11a and IEEE 802.11g is 54 Mbps. The SU data throughput of network devices operating according to IEEE 802.11n is 600 Mbps. The SU data throughput of network devices operating according to IEEE 802.11ac is greater than 1 giga-bits-per-second (Gbps).

WLANs operating according to IEEE 802.11a, IEEE 802.11b, IEEE 802.11g, IEEE 802.11n, IEEE 802.11ac, or IEEE 802.11ad operate in 2.4 giga-hertz (GHz), 5 GHz, and 60 GHz frequency bands. The 2.4 GHz, 5 GHz and 60 GHz bands refer to a 2.4-2.5 GHz frequency range, a 5.725-5.875 frequency range, and a 61-61.5 GHz frequency range. The lower the band (or frequency range), the larger the range (or distance) signals can be transmitted between network devices. To further increase the transmission distance of a network device, IEEE 802.11 standards such as IEEE 802.11ah and 802.11af have been introduced. Network devices operating according to IEEE 802.11ah and IEEE 802.11af exhibit signal transmission in sub-1 GHz frequency ranges.

A network device operating according to IEEE 802.11ah transmits and receives signals in a sub-1 GHz band (e.g., 900 MHz band). Signals are transmitted at center frequencies of less than 1 GHz with bandwidths of 2 MHz, 4 MHz, 8 MHz, or 16 MHz. The bandwidths are 10 times (10×) downclocked from bandwidths (20 MHz, 40 MHz, 80 MHz, 160 MHz) associated with IEEE 802.11ac.

SUMMARY

A first network device is provided and includes a physical layer module and medium access control module. The medium access control module is configured to (i) generate a first capabilities element, and (ii) in a sub-1 GHz band, transmit the first capabilities element to a second network device. The first capabilities element includes (i) a multi-bit field indicating whether transmission of a packet with a traveling pilot is supported by the first network device, or (ii) a field indicating whether transmission of a single spatial stream over a 1 MHz channel from the first network device to the second network device is supported by the first network device. The medium access control module is configured to, subsequent transmitting the first capabilities element to the second network device, forward data to the physical layer module. The physical layer module is configured to (i) generate the packet to include the data, where the packet includes the traveling pilot if the first capabilities element indicates transmission of the packet with the traveling pilot is supported by the first network device, and (ii) according to the first capabilities element, transmit the packet to the second network device via one or more spatial streams, and where the one or more spatial streams includes the single spatial stream.

In other features, a first network device is provided and includes a physical layer module and a medium access control module. The physical layer module is configured to receive a first capabilities element in a sub-1 GHz band from a second network device. The first capabilities element includes (i) a multi-bit field indicating whether transmission of a packet with a traveling pilot is supported by the second network device, or (ii) a field indicating whether transmission of a single spatial stream over a 1 MHz channel from the second network device to the first network device is supported by the second network device. The medium access control module is configured to, subsequent to the physical layer module receiving the first capabilities element from the second network device, receive data from the physical layer module. The physical layer module is configured to, according to the first capabilities element, receive the packet from the second network device via one or more spatial streams, where the one or more spatial streams includes the single spatial stream, where the packet includes the data, and where the packet includes the traveling pilot if the first capabilities element indicates the second network device supports transmission of the packet with the traveling pilot.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

A network device operating according to IEEE 802.11TGah (also referred to as IEEE 802.11ah/D3.0) transmits and receives signals in a sub-1 GHz (S1G) band (e.g., 900 MHz band). Signals are transmitted at center frequencies of less than 1 GHz with bandwidths of 1 MHz or greater than or equal to 2 MHz. Examples disclosed below include network devices operating according to IEEE 802.11TGah and transmitting and receiving signals in the sub-1 GHz band (e.g., 900 MHz band). The signals may be transmitted at center frequencies of less than 1 GHz with bandwidths of 1 MHz or greater than or equal to 2 MHz.

Figure 1:
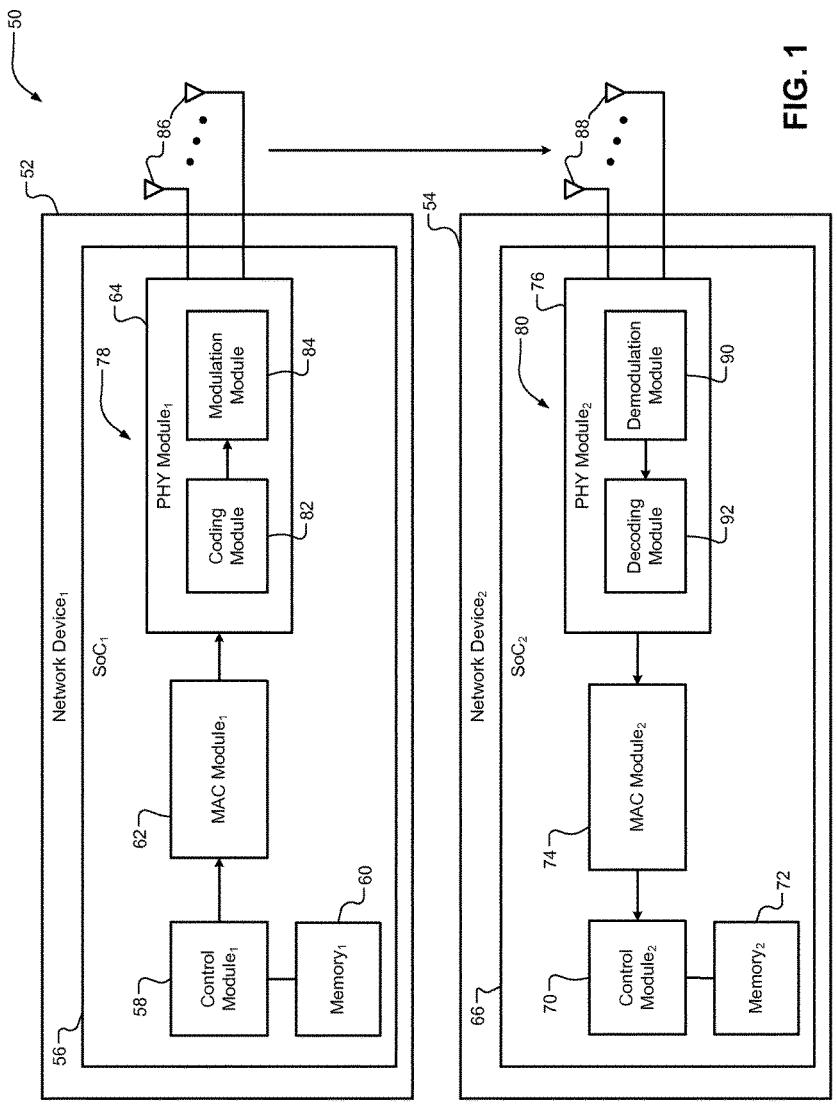
FIG. 1 is a functional block diagram of a wireless system incorporating network devices configured according to an embodiment of the present disclosure.

FIG. 1 shows a wireless system 50 that includes network devices 52, 54. Although two network devices are shown, any number of network devices may be included in the wireless system 50. The wireless system 50 may be used in various applications and may include and/or be implemented in various types of networks. The applications may include medical instruments and equipment, wireless consumer products, wireless equipment used in stores, automotive equipment, control systems, security systems, etc. The networks may include personal and commercial communication networks, global positioning system (GPS) networks, cellular networks, broadcasting networks, industrial control networks, wireless local area networks (WLANs), etc. Examples of WLANs are Wi-Fi™ networks, Bluetooth® networks, automobile control and sensor networks, and home and office automation and security networks (e.g., a ZigBee™ network).

The network devices 52, 54 may be, for example, computers, mobile devices, cellular devices, appliances, instruments, products, security equipment, toys, etc. Also, although the first network device 52 is shown as a transmitting device and the second network device 54 is shown as a receiving device, each of the network devices 52, 54 may be configured to both transmit and receive signals according to the various modes of operation disclosed herein.

The first network device 52 includes a first system-on-chip (SoC) 56. The first SoC 56 includes a first control module 58, a first memory 60, a first media access control (MAC) module 62, and a first physical layer (PHY) module 64. The first control module 58 may include the modules 62, 64. The second network device 54 includes a second SoC 66. The second SoC 66 includes a second control module 70, a second memory 72, a second MAC module 74, and a second PHY module 76. The second control module 70 may include the modules 74, 76.

Although a transmit path 78 and corresponding modules and devices are shown for the first MAC module 62 and the first PHY module 64, the first MAC module 62 and the first PHY module 64 may include a receive path and corresponding modules and devices similar to the second network device 54. Although a receive path 80 and corresponding modules and devices are shown for the second MAC module 74 and the second PHY module 76, the second MAC module 74 and the second PHY module 76 may include a transmit path and corresponding modules and devices similar to the first network device 52.

The control modules 58, 70 and/or MAC modules 62, 74 may operate according to various wireless system protocols, such as ZigBee™ protocols, Wi-Fi™ protocols, Worldwide Interoperability for Microwave Access® (WiMax®) protocols, Long-Term Evolution™ (LTE™) protocols, etc. The PHY modules 64, 76 may operate according to the IEEE 802.11.TGah standard. The PHY modules 64, 76 may operate in various modes. The modes have corresponding frame (or packet) formats, data transmission rates, coding and decoding methods, and modulation types, as described in the IEEE 802.11TGah and/or IEEE 802.11ah standards. Formats of transmitted signals and/or frame formats are at least partially different than that described in IEEE 802.11TGah and/or IEEE 802.11ah standard drafts prior to Dec. 26, 2013. Format examples of portions of signals and frames transmitted and received by the PHY modules 64, 76 are disclosed below. The PHY modules 64, 76 may include and/or be implemented as circuits having one or more amplifiers, filters, mixers, local oscillators, converters (e.g., analog-to-digital (A/D) converters, D/A converters, downconverters, and/or upconverters), equalizers, etc.

The first control module 58 may access data in the memory 60 and forward the data to the first MAC module 62. The first control module 58 may (i) control flow of traffic in the wireless system 50 and between the network devices 52, 54 (and/or between the network device 52 and other network devices in the wireless system 50), and/or (ii) select an operating mode. For example, the first control module 58 may select the operating mode based on a predetermined transmission rate, code rate, modulation type, operating band, operating bandwidth and/or other predetermined parameter. Different modulation and coding sets (MCSs) identified as MCS-index(IDX) 0-10 with corresponding modulation types and code rates are shown in Table 1 for a 1 MHz bandwidth and a single spatial stream (also referred to as a single space time stream), where BPSK is binary phase shift keying and QAM is quadrature amplitude modulation. The coding may also include repetition coding, where bits are repeated a predetermined number of times. Table 1 is provided as an example, other modulation types and code rates may be used for other bandwidths and numbers of spatial streams. Additional modulation types and code rates are provided in IEEE 802.11ah.

TABLE 1

Modulation and Coding Sets

| MCS-IDX | Modulation Type | Code Rate |
|---|---|---|
| 0 | BPSK | 1/2 |
| 1 | QPSK | 1/2 |
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |
| 8 | 256-QAM | 3/4 |
| 9 | 256-QAM | 5/6 |
| 10 | BPSK | 1/4 |

As an alternative to the first control module 58 selecting the operating mode, the first MAC module 62 and/or the first PHY module 64 may select the operating mode. The module that determines the operating mode may indicate the operating mode to the other modules of the first network device 52. The modules 62, 64 operate according to the selected operating mode. The modules 74, 76 may also operate according to the selected operating mode.

In one embodiment, the first network device 52 transmits frames according to the selected operating mode and the second network device 54 detects, receives, demodulates, and decodes the frames. In another embodiment, the first network device 52 transmits a beacon indicating the operating mode and the second network device decodes the frames according to the indicated operating mode. In yet another embodiment, the network devices perform a "handshake" process to determine the operating mode. For example, the control modules 58, 70, the MAC modules 62, 74, or the PHY modules 64, 76 exchange information to determine the operating mode. This may include the first network device 52 (one of the modules 58, 62, 64) selecting an operating mode and the second network device 54 (one of the modules 70, 74, 76) requesting a different operating mode. The information may indicate, for example, which operating modes that the network devices 52, 54 are capable of operating and/or transmission rates of the network devices 52, 54.

The first MAC module 62 may (i) receive bits of data from the first control module 58, (ii) generate frames, and (iii) transmit the frames to the first PHY module 64. Each of the frames may be in a predetermined format according to the selected operating mode. The first PHY module 64 includes a coding module 82 and a modulation module 84. The coding module 82 performs coding on frames received from the first MAC module 62 according to the selected operating mode. The modulation module 84 modulates an output of the coding module 82. The modulation may include converting a baseband signal to a radio frequency signal, which may be transmitted from the first PHY module 64 and received at the second PHY module 76 via antennas 86, 88. Each of the PHY modules 64, 76 may include one or more antennas. The PHY modules 64, 76 may transmit and receive multiple spatial streams (or signals) via the antennas 86, 88.

The second PHY module 76 may receive the RF signal from the first PHY module 64. The second PHY module 76 may tune to the sub-1 GHz band, one or more of the channels of the sub-1 GHz band and/or one or more corresponding center frequencies. One of the modules 70, 74, 76 may determine the operating mode based on, for example: a beacon transmitted by the first PHY module 64; the handshake process, a format of a received frame, and/or a field of a received frame indicating the operating mode. The module that determines the operating mode may indicate the operating mode to the other modules of the second network device 54.

The second PHY module 76 includes a demodulation module 90 and a decoding module 92. The demodulation module 90 demodulates received signals including frames transmitted from the first PHY module 64. The demodulation module 90 may downconvert the RF signal to a baseband signal. The demodulation may comply with the IEEE 802.11TGah and/or IEEE 802.11ah standards. The decoding module receives and may decode the demodulated signal. The second MAC module 74 forwards decoded frames received from the second PHY module 76 to the second control module 70. The second control module 70 may store the frames in the second memory 72.

Prior to transferring frames of data, the PHY modules 64, 76 may exchange capabilities information by exchanging S1G capabilities elements, as described below. The S1G capabilities information elements may be generated by the MAC modules 62, 74. As an example, the first network device 52 (or first station) may transmit a S1G capabilities element to the second network device 54 (or second station) to indicate to the second network device 54 that the first network device 52 is a S1G network device. A S1G network device refers to a network device configured to operate according to an IEEE 802.11ah and/or IEEE 802.11TGah standards, exchange S1G capabilities elements, and transmit and receive signals in a sub-1 GHz band. An IEEE 802.11ah compatible network device and an IEEE 802.11TGah compatible network device refer to network devices that at least partially comply respectively with IEEE 802.11ah and/or IEEE 802.11TGah. The S1G capabilities element may include various fields of information, as shown in FIG. 2.

Figure 2:
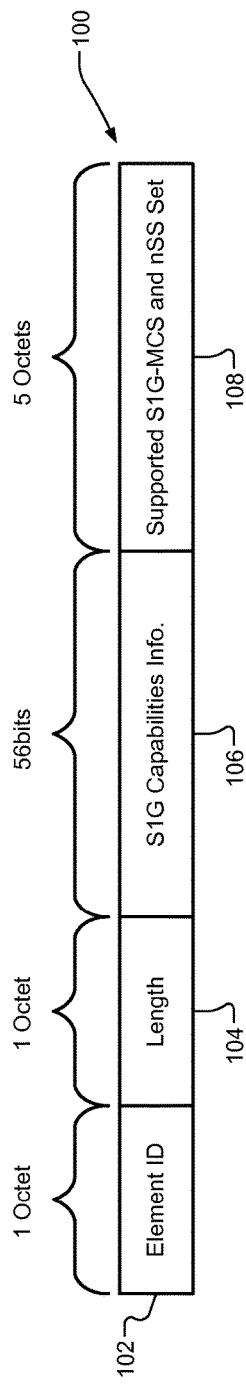
FIG. 2 is a block diagram illustrating a format of a S1G capabilities element in accordance with an embodiment of the present disclosure.
Figure 3:
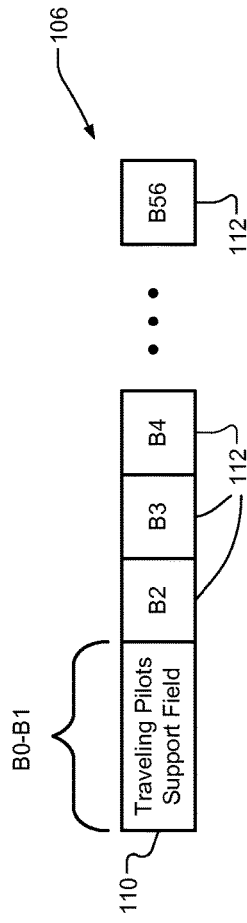
FIG. 3 is a block diagram illustrating a format of a S1G capabilities information field of the S1G capabilities element of FIG. 2.
Figure 4:
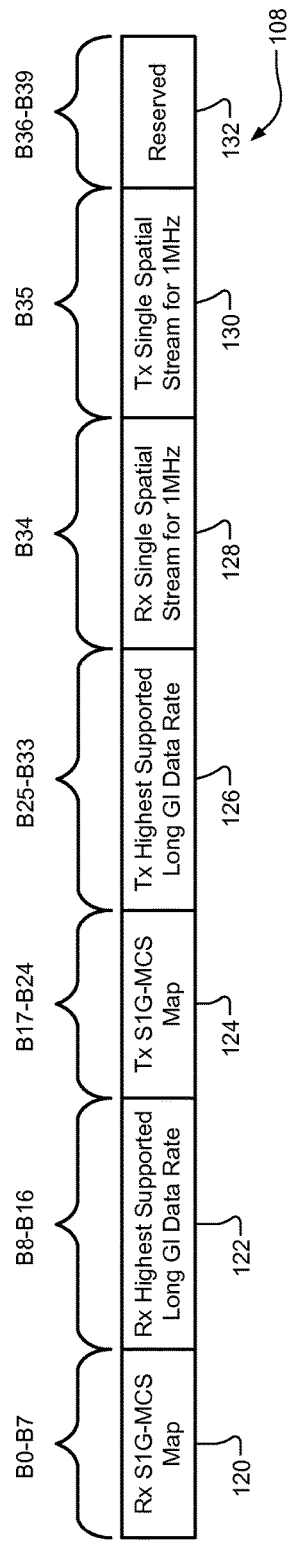
FIG. 4 is a block diagram illustrating a format of a supported S1G-MCS and nSS set field of the S1G capabilities element of FIG. 2.

FIG. 2 shows a S1G capabilities element 100. The S1G capabilities element 100 may include 16 octets and 3 bits of information with an element identifier field 102, a length field 104, a S1G capabilities information field 106, and a supported S1G-MCS and nSS set field 108. The element identifier field 102 may include a value that identifies the S1G capabilities element 100. The length field 104 may, for example, identify a length of the S1G capabilities element 100, a field of the S1G capabilities element 100, and/or a portion of the S1G capabilities element 100. An example format of the S1G capabilities information field 106 is shown in FIG. 3. An example format of the supported S1G-MCS and nSS set field 108 is shown in FIG. 4.

FIG. 3 shows the S1G capabilities information field 106. The S1G capabilities information field 106 may include 56 bits of information with a traveling pilots support field 110 and other fields 112. The traveling pilots support field 110 indicates whether the corresponding network device supports reception of packets with physical layer convergence procedure (PLCP) protocol data units (PPDUs) having traveling pilots. Pilot signals are generally transmitted on a fixed set of subcarriers (or tones) among a plurality of symbols. Traveling pilots refer to a scenario in which the subcarriers (or tones) over which the pilot signals are transmitted are changed from symbol to symbol—i.e., traveling pilots refer to pilot subcarriers in orthogonal frequency divisional multiplexing (OFDM) symbols that change locations symbol-by-symbol in a frequency domain relative to data subcarriers of the OFDM symbols. The OFDM symbols are in a data portion of a packet. Examples of the other fields 112 of the S1G capabilities information field 106 are provided in FIG. 8-401*dg* and Table 8-191d of the IEEE 802.11ah standard.

The traveling pilots support field 110 is a multi-bit field that may be set to '0' (bit values 00) if reception of traveling pilots is not supported. The traveling pilots support field 110 may be set to '1' (bit values 01) if reception of traveling pilots (i) is supported for one spatial stream, and (ii) is not supported for multiple spatial streams. The multiple spatial streams may be based on a space time block code (STBC). The traveling pilots support field 110 may be set to '3' (bit values 11) if reception of traveling pilots is supported for (i) a single spatial stream, and (ii) multiple spatial streams. The multiple spatial streams may be based on a STBC. A traveling pilots support field of '2' (bit values 10) is reserved.

Referring to FIGS. 1 and 3, the traveling pilots support field 110 may be set to '1' or '3' if a traveling pilot capability bit is '1' or TRUE. The traveling pilot capability bit indicates whether sending and receiving of traveling pilots is supported. The traveling pilot capability bit may be stored in memory (one of the memories 60, 72) of a network device and accessed via, for example, a MAC module (e.g., one of the MAC modules 62, 74) and/or a PHY module (e.g., one of the PHY modules 64, 76) of the network device. The traveling pilot capability bit may be set via software and/or by the MAC module and/or PHY module. The traveling pilots support field may be set to '0' if the traveling pilot capability bit is '0' or FALSE.

In one embodiment, a first S1G station (e.g., one of the network devices 52, 54) does not transmit a packet with a TXVECTOR parameter DOPPLER set to '1' to a second S1G station (e.g., the other one of the network devices 52, 54) unless: a traveling pilots support field of a most recent S1G capabilities element received at the first S1G station from the second S1G station included a value of '1' or '3'; and the traveling pilot capability bit of the first S1G station is TRUE. The TXVECTOR parameter DOPPLER is one of many parameters of the TXVECTOR and indicates whether traveling pilots are used in a packet.

The TXVECTOR refers to a virtual interface between a MAC module and a PHY module of a station for each packet transmitted or received. The TXVECTOR also refers to and/or includes multiple parameters. The parameters may be stored in the memory and accessed by the MAC module and the PHY module. Some of the parameters indicate how to set corresponding fields in a signal SIG field of a transmitted packet. The parameters are used for defining characteristics for each transmission of one or more PPDUs. S1G capabilities information, as included in the S1G capabilities element 100, defines capabilities of a corresponding station and/or access point. After S1G capabilities information has been exchanged between an access point and one or more stations and when optional capabilities are used for PPDU transmission, TXVECTOR parameters may be transmitted between stations. Prior to S1G capabilities information being exchanged, PPDUs may be transmitted with mandatory capabilities information. The mandatory capabilities information may refer to capability information included in, for example, a probe request.

FIG. 4 shows the supported S1G-MCS and nSS set field 108, where n may be an integer greater than or equal to 1 and less than or equal to 4, and where SS is spatial stream (or space time stream). The supported S1G-MCS and nSS set field 108 includes: a receive (Rx) S1G-MCS map field 120; a Rx highest supported long guard interval (GI) data rate field 122; a transmit (Tx) S1G-MCS map field 124; a Tx highest supported long GI data rate field 126; a Rx single spatial stream for 1 MHz field 128; a Tx single spatial stream for 1 MHz field 130; and a reserved field 132. Definitions and corresponding encoding for the fields of the supported S1G-MCS and nSS set field 108 are provided in Table 2.

TABLE 2

Fields of Supported S1G-MCS and nSS Set Field

Figure 5:
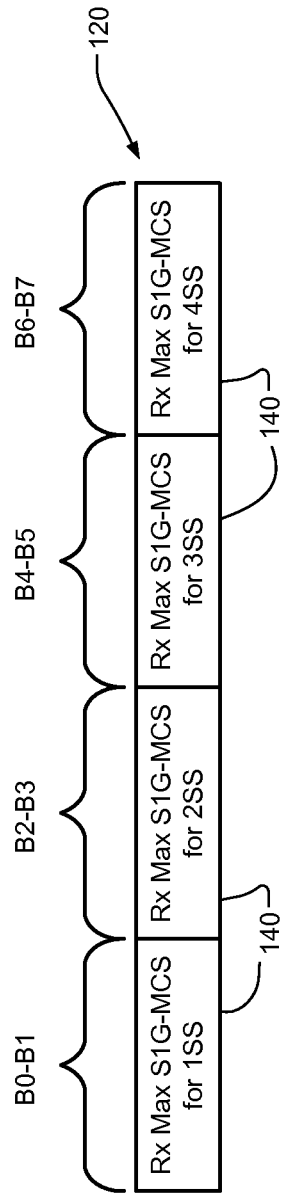
FIG. 5 is a block diagram illustrating a format of a Rx S1G-MCS map field of the S1G capabilities element of FIG. 2.
Figure 6:
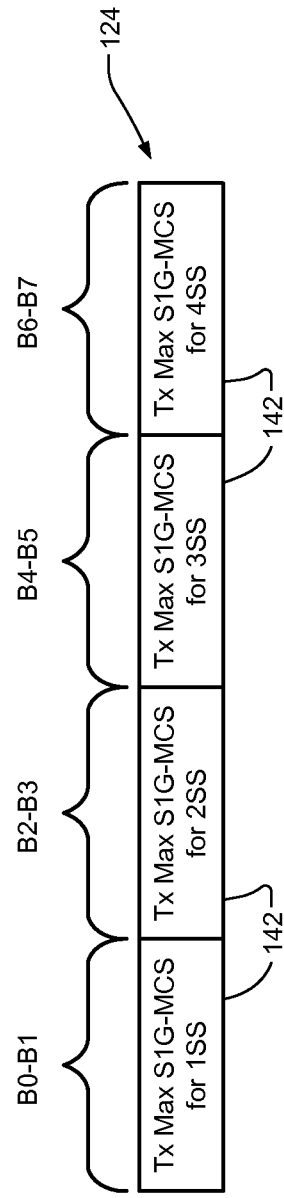
FIG. 6 is a block diagram illustrating a format of a Tx S1G-MCS map field of the S1G capabilities element of FIG. 2.

| Field | Definition | Encoding |
|---|---|---|
| Rx S1G-MCS Map | Indicates a maximum value of a RXVECTOR parameter MCS of a PPDU that may be received at channel widths supported by corresponding network device for each number of spatial streams. | A format of this field is shown in FIG. 5. If the Rx Single Spatial Stream for 1 MHz field is set to '0', then the fields of the Rx Single Spatial Stream field are applicable for both a 1 MHz bandwidth channel and greater than or equal to 2 MHz bandwidth channels. If the Rx Single Spatial Stream for 1 MHz field is set to '1', then the Max S1G-MCS for 1 SS field is applicable for a 1 MHz bandwidth channel and Max S1G-MCSs for other SS fields (e.g., 2SS, 3SS, and 4SS) are not applicable for 1 MHz bandwidth channels. |
| Rx Highest Supported Long GI Data Rate | Indicates the highest long GI S1G data rate that the network device is able to receive. | A largest integer value less than or equal to a highest long GI S1G PPDU data rate in mega-bits-per-second (Mb/s) the network device is able to receive. A value '0' indicates that this subfield does not specify the highest long GI S1G PPDU data rate that the network device is able to receive. |
| Tx S1G-MCS Map | Indicates a maximum value of a TXVECTOR parameter MCS of a PPDU that may be transmitted at channel widths supported by corresponding network device for each number of spatial streams. | A format of this field is shown in FIG. 6. If the Tx Single Spatial Stream for 1 MHz field is set to '0', then the fields of the Rx Single Spatial Stream field are applicable for both a 1 MHz bandwidth channel and greater than or equal to 2 MHz bandwidth channels. If the Tx Single Spatial Stream for 1 MHz field is set to '1', then the Max S1G-MCS for 1 SS field is applicable for a 1 MHz bandwidth channel and Max S1G-MCSs for other SS fields (e.g., 2SS, 3SS, and 4SS) are not applicable for 1 MHz bandwidth channels. |
| Tx Highest Supported Long GI Data Rate | Indicates a highest long GI S1G PPDU data rate that the network device is able to transmit. | A largest integer value less than or equal to a highest long GI S1G PPDU data rate in Mb/s that the network device is able to transmit. A value '0' indicates that this subfield does not specify the highest long GI S1G PPDU data rate that the network device is able to transmit. |

TABLE 2-continued

Fields of Supported S1G-MCS and nSS Set Field

| Field | Definition | Encoding |
|---|---|---|
| Rx Single Spatial Stream for 1 MHz | Indicates whether a single spatial stream PPDU may be received over a 1 MHz bandwidth channel by this network device and other multiple spatial stream PPDUs may not be received over a 1 MHz bandwidth channels by this network device. | A '1' indicates a single spatial stream is received and multiple spatial streams are not be received over a 1 MHz bandwidth channel. A '0' indicates a same number of spatial streams as implied by the Rx S1G-MCS map field may be received, as each spatial stream has a corresponding Rx S1G-MCS in the Rx S1G-MCS Map field. |
| Tx Single Spatial Stream for 1 MHz | Indicates whether a single spatial stream PPDU may be transmitted over a 1 MHz bandwidth channel by this network device and other multiple spatial stream PPDUs may not be transmitted over a 1 MHz bandwidth channels by this network device. | A '1' indicates a single spatial stream is be transmitted and multiple spatial streams are not be transmitted over a 1 MHz bandwidth channel. A '0' indicates a same number of spatial streams as implied by the Tx S1G-MCS map field may be transmitted, as each spatial stream has a corresponding Tx S1G-MCS in the Tx S1G-MCS Map field. |

Channels having 1 MHz bandwidth may be used for increased range (distance over which signals are to be transmitted). Low MCS-IDX values may correspond to transmissions over 1 MHz channels. For multiple-input-multiple-output devices (e.g., the network devices 52, 54 of FIG. 1), multiple spatial streams may be transmitted over channel having bandwidths of greater than or equal to 2 MHz, where each spatial stream is transmitted over a different path.

In one embodiment, a single spatial stream may be transmitted for a channel bandwidth of 1 MHz. Multiple spatial streams may not be transmitted over multiple pathes. Multiple spatial streams concurrently transferring data over 1 MHz channel provide a same or slower data transfer rate as a single channel having greater than or equal to 2 MHz bandwidth. Also, one spatial stream transmission over 2 MHz bandwidth channel is typically more reliable than the multiple spatial stream transmission over 1 MHz channel. Thus, if higher data rate is needed to transmit data, the data may be transmitted via a single channel having greater than or equal to 2 MHz bandwidth. As a result, a 1 MHz channel may only be used for transmission of a single spatial stream for wider range and channels having bandwidths greater than or equal to 2 MHz may be used for transmission of one or more spatial streams for higher data rate. 1 MHz channel may not be used for transmitting multiple spatial streams. One or more channels having greater than or equal to 2 MHz bandwidth may be used for one or more spatial streams.

FIG. 5 shows an example of the Rx S1G-MCS map field 120. The Rx S1G-MCS map field 120, as shown, includes four Max S1G-MCS for nSS fields 140. The Rx S1G-MCS map field 120 may include a different number of Max S1G-MCS for nSS fields. Each of the Max S1G-MCS for nSS fields 140 is associated with a number and/or set of spatial streams received and indicates a maximum (Max) S1G-MCS for nSS, where n is an integer greater than or equal to 1 and identifies a number of spatial streams. The number of fields in the Rx S1G-MCS map field 120 is equal to 4. Each of the Max S1G-MCS for nSS fields 140 provides an integer value. Table 3 provides example integer values and corresponding support provided by a network device. Table 3 is applicable for both the Rx S1G-MCS map field 120 and the Tx S1G-MCS map field 124. The integer values of the Max S1G-MCS for nSS fields 140 correspond to S1G MCS-index (IDX) values indicating a modulation type and a code rate. The code rate may be a maximum code rate for the number of spatial streams that the corresponding network device supports.

TABLE 3

Max S1G-MCS for nSS Field Value Mapping

| Max S1G-MCS for nSS Field Values | Network Device Support |
|---|---|
| 0 | Indicates support for S1G-MCS 2 for n spatial streams. |
| 1 | Indicates support for S1G-MCS 7 for n spatial streams. |
| 2 | Indicates support for S1G-MCS 9 for n spatial streams. |
| 3 | Indicates that n spatial streams are not supported. |

FIG. 6 shows an example of the Tx S1G-MCS map field 124. The Tx S1G-MCS map field 124, as shown, includes four Max S1G-MCS for nSS fields 142. The Tx S1G-MCS map field 124 may include a different number of Max S1G-MCS for nSS fields. Each of the Max S1G-MCS for nSS fields 142 is associated with a number and/or set of spatial streams transmitted and indicates a maximum (Max) S1G-MCS for nSS, where n is an integer greater than or equal to 1 and identifies a number of spatial streams. The number of fields in the Tx S1G-MCS map field 124 is equal to 4. Each of the Max S1G-MCS for nSS fields 142 provides an integer value. Table 3 provides example integer values and corresponding support provided by a network device. The integer values of the Max S1G-MCS for nSS fields 142 may correspond to S1G MCS-IDX values indicating a modulation type and a code rate. The code rate may be a maximum code rate for the number of spatial streams that the corresponding network device supports.

Figure 7:
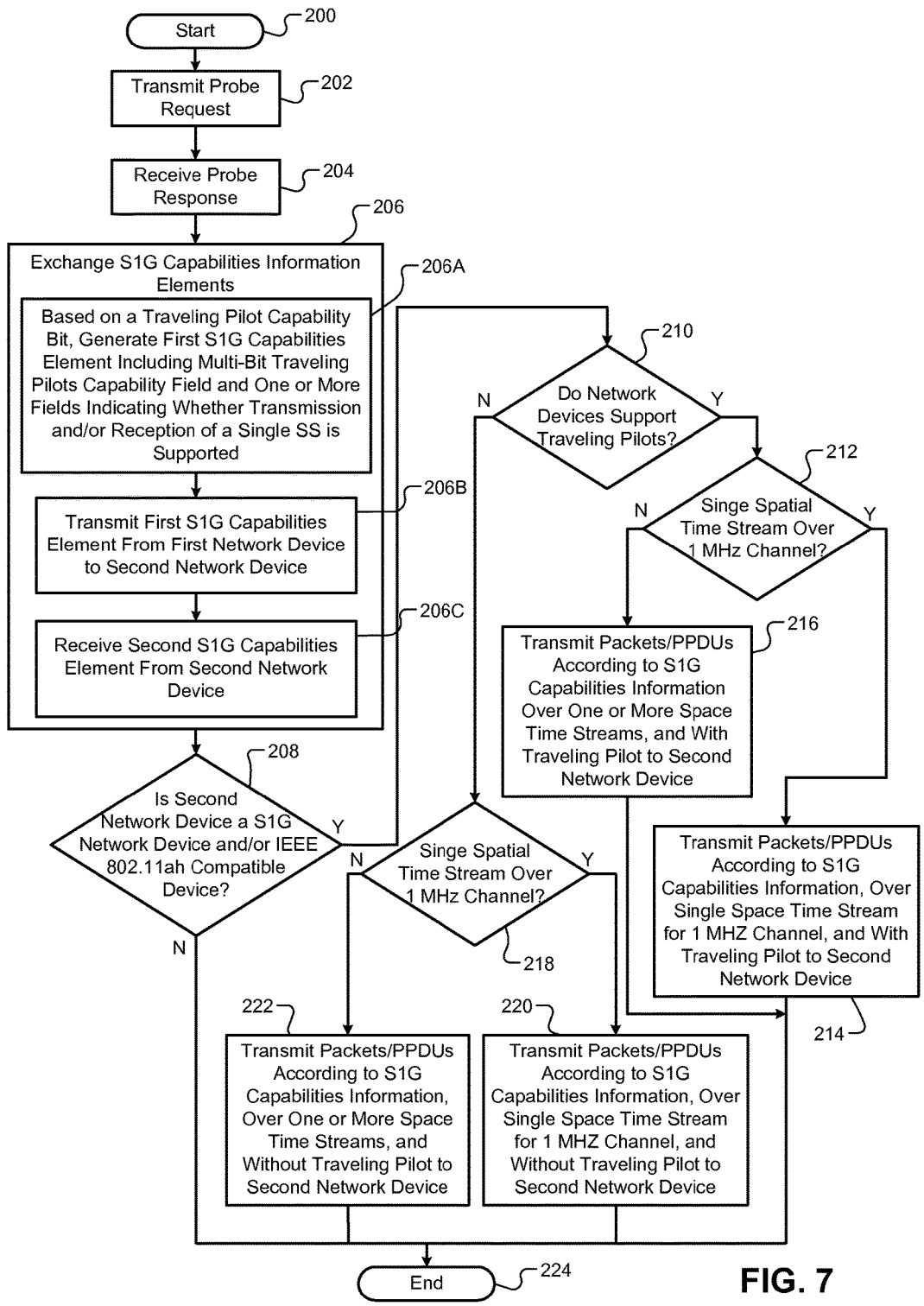
FIG. 7 illustrates a transmission method in accordance with an embodiment of the present disclosure.
Figure 8:
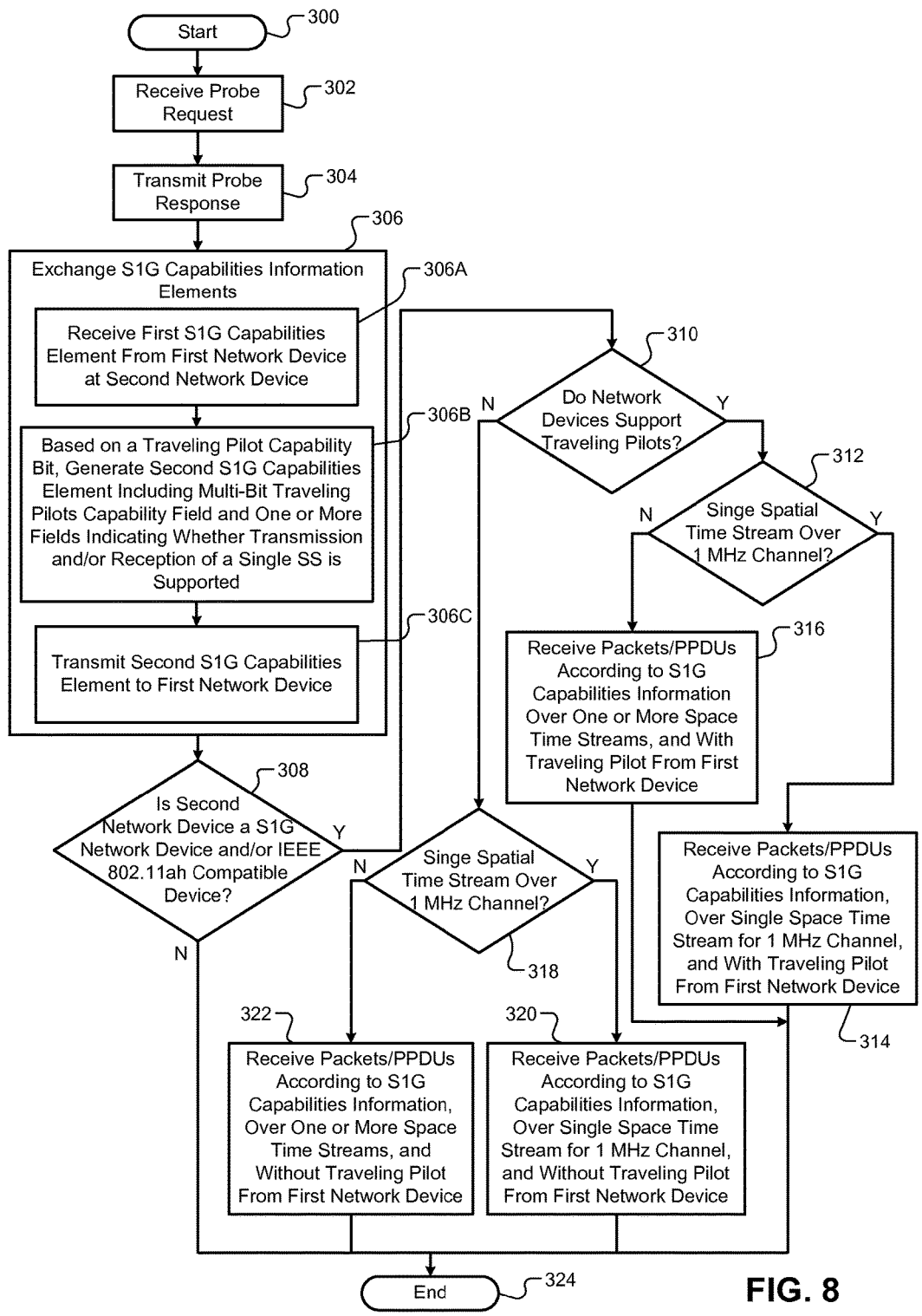
FIG. 8 illustrates a reception method in accordance with an embodiment of the present disclosure.

The network devices 52, 54 disclosed herein may be operated using numerous methods, example methods are illustrated in FIGS. 7-8. FIG. 7 shows a transmission method. Although the following tasks are primarily described with respect to the implementations of FIGS. 1-6, the tasks may be easily modified to apply to other implementations of the present disclosure. The tasks may be iteratively performed. The tasks of FIG. 8 may be performed along with the tasks of FIG. 7. For example, a first network device (e.g., the first network device 52) may perform the tasks of FIG. 7 while a second network device (e.g., the second network device 54) performs the tasks of FIG. 8.

The method may begin at 200. At 202, the first network device may transmit a probe request signal. The first network device may be a STA. At 204, the second network device may (i) receive the probe request signal, and (ii) generate a probe response signal in response to the probe request signal to establish a connection with the first network device.

At 206, the network devices may exchange S1G capabilities elements (e.g., the S1G capabilities element 100). The S1G capabilities elements may be transmitted as part of the probe request signal and probe response signal or may be transmitted subsequent to and/or separate from the probe request signal and the probe response signal.

At 206A, the first network device may generate a first S1G capabilities element. This may be based on a traveling pilot capability bit indicating whether the first network device supports transmission of packets including traveling pilots and/or is to include one or more traveling pilots in one or more packets. The traveling pilot capability bit may be stored in memory of the first network device (e.g., the memory 60 or other memory of the first network device). The first S1G capabilities element also includes a first multi-bit traveling pilots support field (e.g., the traveling pilots support field 110) and one or more fields indicating whether transmission and/or reception of a single space time stream for in 1 MHz channel is supported by the first network device (e.g., the single spatial streams for 1 MHz fields 128, 130).

At 206B, the first network device transmits the first S1G capabilities element to the second network device. At 206C, the first network device may receive a second S1G capabilities element from the second network device. The second S1G capabilities element may include a second multi-bit traveling pilots support field (e.g., the traveling pilots support field 110) and one or more fields indicating whether transmission and/or reception of a single space time stream for 1 MHz channel is supported by the second network device (e.g., the single spatial streams for 1 MHz fields 128, 130).

At 208, if the second network device is a S1G network device and/or is IEEE 802.11ah and/or IEEE 802.11TGah compatible, then task 210 is performed, otherwise the method may end at 224. The network devices, other than certain S1G capabilities information fields disclosed herein, may fully comply with IEEE 802.11ah and/or IEEE 802.11TGah. As alternative to ending at 224 subsequent to performing task 208, the network devices may communicate via a protocol that complies with a standard other than IEEE 802.11ah and/or IEEE 802.11TGah. As an Example, the network devices may communicate according to IEEE 802.11, IEEE 802.11a, IEEE 802.11b, IEEE 802.11ac, IEEE 802.11af, IEEE 802.15.4, or other standard.

At 210, if the network devices support transmission and/or reception of packets including traveling pilots, then task 212 is performed. At 212, if a Tx single spatial stream for 1 MHz field of the first S1G capabilities element indicates transmission over only a single spatial stream, then task 214 is performed, otherwise task 216 is performed. For example, if the Tx single spatial stream for 1 MHz field of the first S1G capabilities element is set HIGH or to '1' and the second network device supports reception of a single spatial stream over a 1 MHz channel, then task 214 is performed. If a Rx single spatial stream for 1 MHz field of the second S1G capabilities element indicates that the second network device does not support reception of packets over a single spatial stream in a 1 MHz channel, then task 216 is performed. At 214, the first network device transmits one or more packets including one or more traveling pilot via a single spatial stream over the 1 MHz channel. The packets may include PPDUs. At 216, the packets and/or PPDUs are transmitted with traveling pilots over one or more spatial streams. The one or more spatial streams may be transmitted on channels that each have greater than or equal to 2 MHz bandwidth.

The traveling pilots support feature (provided at 210) may be a separate feature from the single spatial time stream over 1 MHZ channel features (provided at 212, 218) and for this reason may be provided separately. The features may be performed alone, in parallel (during a same period of time) and/or at different times. One of the features may be provided while the other feature is being provided. For example, task 210 may be performed separately from tasks 212 and 218. For example, tasks 212 and 218 may be skipped, such that task 222 is performed if the network devices do not support traveling pilots. Task 216 may be performed if the network devices do support traveling pilots. As another example, task 210 may be skipped, either tasks 218, 220, and 222 may be performed subsequent to task 208 or tasks 212, 214, 216 may be performed subsequent to task 208.

If one of the network devices does not support both transmission and reception of packets with traveling pilots or if one of the network devices is capable of transmitting packets with traveling pilots and the other network device does not support reception of the packets with the traveling pilots, then task 218 is performed subsequent to task 210. However, if, for example, the first network device supports transmission of packets with traveling pilots and the second network supports reception of the packets with the traveling pilots, then task 212 may be performed subsequent to task 210. In this example, the first network device transmits the packets having the traveling pilots to the second network device. The first network device may not support both transmission and reception of packets having traveling pilots, but rather may support either transmission or reception of the packets with the traveling pilots. Similarly, the second network device may not support both transmission and reception of packets having traveling pilots, but rather may support either transmission or reception of the packets with the traveling pilots.

At 218, if a Tx single spatial stream for 1 MHz field of the first S1G capabilities element indicates transmission over only a single spatial stream and if a Rx single spatial stream for 1 MHz field of the second S1G capabilities element indicates the second network device supports reception via only a single spatial stream, then task 220 is performed, otherwise task 222 is performed.

At 220, the first network device transmits one or more packets without traveling pilots via a single spatial stream over the 1 MHz channel. The packets may include PPDUs. At 222, the packets and/or PPDUs are transmitted without traveling pilots over one or more spatial streams. The one or more spatial streams may be transmitted on channels that each have greater than or equal to 2 MHz bandwidth. Subsequent to performing tasks 214, 216, 220, 222, the method may end at 224.

FIG. 8 shows a reception method. Although the following tasks are primarily described with respect to the implementations of FIGS. 1-6, the tasks may be easily modified to apply to other implementations of the present disclosure. The tasks may be iteratively performed.

The method may begin at 300. At 302, the second network device may receive the probe request signal. At 304, the second network device may (i) transmit the probe response signal in response to the probe request signal to establish a connection with the first network device.

At 306, the network devices may exchange S1G capabilities elements (e.g., the S1G capabilities element 100). The S1G capabilities elements may be transmitted as part of the probe request signal and probe response signal or may be transmitted subsequent to and/or separate from the probe request signal and the probe response signal.

At 306A, the second network device receives the first S1G capabilities element from the first network device.

At 306B, the second network device may generate the second S1G capabilities element. This may be based on a second traveling pilot capability bit of the second network device and indicating whether the second network device supports reception of packets including traveling pilots. The second traveling pilot capability bit may be stored in a memory (e.g., the memory 72 or other memory of the second network device). At 306C, the second network device may transmit the second S1G capabilities element to the first network device.

At 308, if the second network device is a S1G network device and/or IEEE 802.11ah and/or IEEE 802.11TGah compatible, then task 310 is performed, otherwise the method may end at 324. As alternative to ending at 324 subsequent to performing task 308, the network devices may communicate via a protocol that complies with a standard other than IEEE 802.11ah and/or IEEE 802.11TGah. As an Example, the network devices may communicate according to IEEE 802.11, IEEE 802.11a, IEEE 802.11b, IEEE 802.11ac, IEEE 802.11af, IEEE 802.15.4, or other standard.

At 310, if the network devices support transmission and/or reception of packets including traveling pilots, then task 312 is performed. At 312, if a Tx single spatial stream for 1 MHz field of the first S1G capabilities element indicates transmission over only a single spatial stream and the second network device supports reception of a single spatial stream over a 1 MHz channel, then task 314 is performed, otherwise task 316 is performed.

The traveling pilots support feature (provided at 310) may be a separate feature from the single spatial time stream over 1 MHZ channel features (provided at 312, 318) and for this reason may be provided separately. The features may be performed alone, in parallel (during a same period of time) and/or at different times. One of the features may be provided while the other feature is being provided. For example, task 310 may be performed separately from tasks 312 and 318. For example, tasks 312 and 318 may be skipped, such that task 322 is performed if the network devices do not support traveling pilots. Task 316 may be performed if the network devices do support traveling pilots. As another example, task 310 may be skipped, either tasks 318, 320, and 322 may be performed subsequent to task 308 or tasks 312, 314, 316 may be performed subsequent to task 308.

At 314, the second network device receives one or more packets including one or more traveling pilot via a single spatial stream over the 1 MHz channel. The packets may include PPDUs. At 316, the packets and/or PPDUs are received with traveling pilots via one or more spatial streams. The one or more spatial streams may be transmitted on channels that each have greater than or equal to 2 MHz bandwidth.

If one of the network devices does not support both transmission and reception of packets including traveling pilots or if one of the network devices is capable of transmitting packets with traveling pilots and the other network device does not support reception of the packets with the traveling pilots, then task 318 is performed subsequent to task 310. However, if, for example, the first network device supports transmission of packets with traveling pilots and the second network supports reception of the packets with the traveling pilots, then task 312 may be performed subsequent to task 310. In this example, the first network device transmits the packets having the traveling pilots to the second network device. The first network device may not support both transmission and reception of packets having traveling pilots, but rather may support either transmission or reception of the packets with the traveling pilots. Similarly, the second network device may not support both transmission and reception of packets having traveling pilots, but rather may support either transmission or reception of the packets with the traveling pilots.

At 318, if a Tx single spatial stream for 1 MHz field of the first S1G capabilities element indicates transmission over only a single spatial stream and if a Rx single spatial stream for 1 MHz field of the second S1G capabilities element indicates the second network device supports reception via only a single spatial stream, then task 320 is performed, otherwise task 322 is performed.

At 320, the second network device receives one or more packets without traveling pilots via a single spatial stream over the 1 MHz channel. The packets may include PPDUs. At 322, the packets and/or PPDUs are received without traveling pilots over one or more spatial streams. The one or more spatial streams may be received on channels that each have greater than or equal to 2 MHz bandwidth. Subsequent to performing tasks 314, 316, 320, 322, the method may end at 324.

The above-described tasks of FIGS. 7-8 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The wireless communications described in the present disclosure can be conducted in full or partial compliance with IEEE standard 802.11-2012, 802.11a, 802.11b, 802.11ac, 802.11d, 802.11af, 802.11ah, and/or 802.11TGah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A first network device comprising: a physical layer module; and a medium access control module configured to (i) generate a first capabilities element, and (ii) in a sub-1 GHz band, transmit the first capabilities element to a second network device, wherein the first capabilities element includes (i) a multi-bit field indicating whether transmission of a packet with a traveling pilot is supported by the first network device, or (ii) a field indicating whether transmission of a single spatial stream over a 1 MHz channel from the first network device to the second network device is supported by the first network device, the first capabilities element further includes a first field including modulation and coding fields, wherein the modulation and coding fields include respective modulation and coding sets, and wherein each of the modulation and coding sets indicates a modulation type and a code rate, and a second field indicating, based on a number of spatial streams indicated by the first field, one of the modulation and coding sets are applicable for transmission of the packet, the medium access control module is configured to, subsequent to transmitting the first capabilities element to the second network device, forward data to the physical layer module, and the physical layer module is configured to (i) generate the packet to include the data, wherein the packet includes the traveling pilot if the first capabilities element indicates transmission of the packet with the traveling pilot is supported by the first network device, and (ii) according to the first capabilities element, transmit the packet to the second network device via one or more spatial streams, and wherein the one or more spatial streams includes the single spatial stream.

2. The first network device of claim 1, wherein the first capabilities element includes (i) the multi-bit field indicating whether transmission of the packet with the traveling pilot is supported by the first network device, and (ii) the field indicating whether transmission of the single spatial stream is supported by the first network device.

3. The first network device of claim 1, wherein the first capabilities element includes a field indicating transmission of only a single spatial stream is supported by the first network device.

4. The first network device of claim 1, further comprising a memory configured to store a traveling pilot bit, wherein: the traveling pilot bit indicates whether (i) the first network device supports transmission of the traveling pilot, or (ii) the packet is to include the traveling pilot; the physical layer module is configured to generate the first capabilities element; and the traveling pilot bit indicates whether the packet is to have the traveling pilot.

5. The first network device of claim 1, wherein the first capabilities element includes (i) the field indicating whether transmission of a single spatial stream over a 1 MHz channel from the first network device to the second network device is supported by the first network device, and (ii) a field indicating whether reception of a single spatial stream over a 1 MHz channel from the second network device is supported by the first network device.

6. The first network device of claim 1, wherein the first capabilities element includes a field indicating (i) one of the modulation and coding sets corresponding to transmission of a single spatial stream on the 1 MHz channel is applicable for transmission of the packet, and (ii) the other ones of the modulation and coding sets are not applicable for transmission of the packet on 1 MHz channel.

7. The first network device of claim 1, wherein: the first capabilities element comprises the multi-bit field; and if the multi-bit field indicates a predetermined value, then the physical layer module (i) supports transmission of the packet via one spatial stream, and (ii) supports transmission of other packets, via two spatial streams.

8. The first network device of claim 1, wherein: the first capabilities element comprises the multi-bit field; if the multi-bit field indicates a first value, then the physical layer module supports transmission of the packet with the traveling pilot via one spatial stream; if the multi-bit field indicates a second value, then the physical layer module supports transmission of the packet with the traveling pilot via multiple spatial streams; and if the multi-bit field indicates a third value, then the physical layer module does not support transmission of the traveling pilot.

9. A first network device comprising: a physical layer module; and a medium access control module configured to (i) generate a first capabilities element, and (ii) in a sub-1 GHz band, transmit the first capabilities element to a second network device, wherein the first capabilities element includes (i) a multi-bit field indicating whether transmission of a packet with a traveling pilot is supported by the first network device, or (ii) a field indicating whether transmission of a single spatial stream over a 1 MHz channel from the first network device to the second network device is supported by the first network device, the first capabilities element further includes a first field including modulation and coding fields, wherein the modulation and coding fields include respective modulation and coding sets, and wherein each of the modulation and coding sets indicates a modulation type and a code rate, and a second field indicating, based on a number of spatial streams indicated by the first field, one of the modulation and coding sets are applicable for transmission of the packet, the medium access control module is configured to, subsequent to transmitting the first capabilities element to the second network device, forward data to the physical layer module, the physical layer module is configured to (i) generate the packet to include the data, wherein the packet includes the traveling pilot if the first capabilities element indicates transmission of the packet with the traveling pilot is supported by the first network device, and (ii) according to the first capabilities element, transmit the packet to the second network device via one or more spatial streams, and wherein the one or more spatial streams includes the single spatial stream, the first capabilities element comprises the multi-bit field, if the multi-bit field indicates a first value, then the physical layer module (i) supports transmission of the packet with the traveling pilot via one spatial stream, and (ii) supports, via two spatial streams, transmission of the packet or a plurality of packets, if the multi-bit field indicates a second value, then the physical layer module supports transmission of the packet with the traveling pilot via a single spatial stream or multiple spatial streams, and if the multi-bit field indicates a third value, then the physical layer module does not support transmission of the traveling pilot.

10. The first network device of claim 1, wherein: the first capabilities element comprises the multi-bit field; if the multi-bit field indicates a first value, then the physical layer module (i) supports transmission of the packet with the traveling pilot via one spatial stream, and (ii) does not support, via two spatial streams, transmission of the packet or a plurality of packets; if the multi-bit field indicates a second value, then the physical layer module supports transmission of the packet with the traveling pilot via a single spatial stream or multiple spatial streams; and if the multi-bit field indicates a third value, then the physical layer module does not support transmission of the traveling pilot.

11. The first network device of claim 1, wherein: the first capabilities element comprises the multi-bit field; if the multi-bit field indicates transmission support of the packet with the traveling pilot, then the physical layer module is configured to transmit a parameter to the second network device along with the packet; and the parameter indicates whether the packet includes the traveling pilot.

12. The first network device of claim 1, wherein the physical layer module is configured to (i) receive a second capabilities element from the second network device, (ii) based on the second capabilities element, determine if the second network device is a capable of receiving the packet in the sub-1 GHz band, and (iii) based on the determination of whether the second network device is capable of receiving the packet in the sub-1 GHz band and according to the second capabilities element, transmit the packet to the second network device in the sub-1 GHz band.

13. A first network device comprising: a physical layer module configured to receive a first capabilities element in a sub-1 GHz band from a second network device, wherein the first capabilities element includes (i) a multibit field indicating whether transmission of a packet with a traveling pilot is supported by the second network device, or (ii) a field indicating whether transmission of a single spatial stream over a 1 MHz channel from the second network device to the first network device is supported by the second network device, and wherein the first capabilities element further includes a first field including modulation and coding fields, wherein the modulation and coding fields include respective modulation and coding sets, and wherein each of the modulation and coding sets indicates a modulation type and a code rate, and a second field indicating, based on a number of spatial streams indicated by the first field, one of the modulation and coding sets are applicable for transmission of the packet; and a medium access control module configured to, subsequent to the physical layer module receiving the first capabilities element from the second network device, receive data from the physical layer module, wherein the physical layer module is configured to, according to the first capabilities element, receive the packet from the second network device via one or more spatial streams, wherein the one or more spatial streams includes the single spatial stream, wherein the packet includes the data, and wherein the packet includes the traveling pilot if the first capabilities element indicates the second network device supports transmission of the packet with the traveling pilot.

14. The first network device of claim 13, wherein the first capabilities element includes (i) the multi-bit field indicating whether transmission of the packet with the traveling pilot is supported by the second network device, and (ii) the field indicating whether transmission of the single spatial stream is supported by the second network device.

15. The first network device of claim 13, wherein the first capabilities element includes a field indicating transmission of only a single spatial stream is supported by the second network device.

16. The first network device of claim 13, further comprising a memory configured to store a traveling pilot bit, wherein: the traveling pilot bit indicates whether the first network device supports reception of the traveling pilot; and the traveling pilot bit indicates whether the packet is to have the traveling pilot.

17. The first network device of claim 13, wherein the first capabilities element includes (i) the field indicating whether transmission of a single spatial stream over a 1 MHz channel from the second network device to the first network device is supported by the second network device, and (ii) a field indicating whether reception of a single spatial stream over a 1 MHz channel from the first network device is supported by the second network device.

18. The first network device of claim 13, wherein the first capabilities element includes a field indicating (i) one of the plurality of modulation and coding sets corresponding to reception of a single spatial stream on the 1 MHz channel is applicable for reception of the packet, and (ii) the other ones of the plurality of modulation and coding sets are not applicable for reception of the packet.

19. The first network device of claim 13, wherein: the physical layer module is configured to (i) generate a second capabilities element based on reception of the first capabilities element, and (ii) transmit the second capabilities element to the second network device; and the second capabilities element includes (i) a second multi-bit field indicating whether reception of the packet with the traveling pilot is supported by the first network device, or (ii) a field indicating whether reception of the single spatial stream over the 1 MHz channel from the second network device to the first network device is supported by the first network device.

20. The first network device of claim 19, wherein: the second capabilities element comprises the second multi-bit field; if the second multi-bit field indicates a first value, then the physical layer module supports (i) reception of the packet with the traveling pilot via one spatial stream, and (ii) does not support, via two spatial streams, reception of the packet or a plurality of packets; if the second multi-bit field indicates a second value, then the physical layer module supports reception of the packet with the traveling pilot via a single spatial stream or multiple spatial streams; and if the second multi-bit field indicates a third value, then the physical layer module does not support reception of the traveling pilot.

21. The first network device of claim 19, wherein: the second capabilities element comprises the second multi-bit field; if the second multi-bit field indicates reception support of the packet with the traveling pilot, then the physical layer module is configured to receive a parameter from the second network device along with the packet; and the parameter indicates whether the packet includes the traveling pilot.

* * * * *